(12) United States Patent
Cook et al.

(10) Patent No.: US 7,794,782 B2
(45) Date of Patent: Sep. 14, 2010

(54) PHOSPHONATE AND SULFIDO SILANE ANTI-CORROSION ADDITIVE FOR ELECTRICAL CABLE RESTORATION FLUID

(75) Inventors: Julie Lyn Cook, Turner, MI (US); Diane Marie Kosal, Midland, MI (US); Lori Ann Stark-Kasley, Midland, MI (US)

(73) Assignee: Dow Corning Corporation, Midland, MI (US)

( * ) Notice: Subject to any disclaimer, the term of this patent is extended or adjusted under 35 U.S.C. 154(b) by 733 days.

(21) Appl. No.: 11/597,671

(22) PCT Filed: Jun. 7, 2005

(86) PCT No.: PCT/US2005/020267

§ 371 (c)(1),
(2), (4) Date: Nov. 22, 2006

(87) PCT Pub. No.: WO2005/124792

PCT Pub. Date: Dec. 29, 2005

(65) Prior Publication Data

US 2007/0235700 A1    Oct. 11, 2007

Related U.S. Application Data

(60) Provisional application No. 60/578,185, filed on Jun. 9, 2004.

(51) Int. Cl.
*B05D 5/12* (2006.01)
*B05D 3/02* (2006.01)

(52) U.S. Cl. .................................. 427/117; 427/393.4

(58) Field of Classification Search ................. 427/117, 427/393.4
See application file for complete search history.

(56) References Cited

U.S. PATENT DOCUMENTS

| | | | |
|---|---|---|---|
| 4,093,641 A | 6/1978 | Plueddemann | |
| 4,299,713 A * | 11/1981 | Maringer et al. | 174/110 SR |
| 4,331,722 A * | 5/1982 | Packo et al. | 138/97 |
| 4,376,180 A | 3/1983 | Turbett et al. | |
| 4,400,429 A * | 8/1983 | Barlow et al. | 428/379 |
| 4,414,355 A | 11/1983 | Pokorny | |
| 4,431,578 A | 2/1984 | Groenhof | |
| 4,766,011 A * | 8/1988 | Vincent et al. | 427/117 |
| 4,840,983 A | 6/1989 | Vincent | |
| 4,845,309 A | 7/1989 | Vincent et al. | |
| 4,961,961 A | 10/1990 | Vincent et al. | |
| 4,978,694 A | 12/1990 | Vincent et al. | |
| 5,200,234 A | 4/1993 | Bertini | |
| 5,372,840 A | 12/1994 | Kleyer et al. | |
| 5,372,841 A * | 12/1994 | Kleyer et al. | 427/117 |
| 5,405,985 A | 4/1995 | Parker et al. | |
| 5,468,893 A | 11/1995 | Parker et al. | |
| 5,583,245 A | 12/1996 | Parker et al. | |
| 5,663,396 A | 9/1997 | Musleve et al. | |
| 6,162,491 A | 12/2000 | Bertini | |
| 6,384,255 B1 | 5/2002 | Backer et al. | |
| 6,384,256 B1 | 5/2002 | Backer et al. | |
| 6,448,426 B1 | 9/2002 | Backer et al. | |
| 6,534,668 B2 | 3/2003 | Backer et al. | |

FOREIGN PATENT DOCUMENTS

| | | | |
|---|---|---|---|
| EP | 0 090 427 B1 | | 3/1983 |
| EP | 0 274 101 B1 | | 6/1993 |
| EP | 0274101 | * | 6/1993 |

OTHER PUBLICATIONS

Kleyer, D. L., Ph.D., et al.; The Importance of Diffusion and Water Scavenging in Dielectric Enhancement of Aged Medium Voltage Underground Cables; Technical Paper Summaries IEEE Power Engineering Society, Jan. 1, 1993.
Bertini, G. J., et al.; The Extension of Cablecure Dielectric Enhancement Technology to Feeder and 35KV Cables; Presented at the 45th Annual Power Distribution Conference, Austin, TX, Oct. 19, 1992.

* cited by examiner

*Primary Examiner*—Brian K Talbot
(74) *Attorney, Agent, or Firm*—Howard & Howard Attorneys PLLC

(57) ABSTRACT

A method of restoring electrical distribution cafes that have lowered performance due to treeing is carried out by (i) supplying the interstices of stranded aluminum conductor portions of such cafes with a restoration fluid comprising an alkoxysilane or mixture of alkoxysilanes selected from aromatic functional alkoxysilanes, alkylalkoxysilanes, amino functional alkoxysilanes, epoxy functional alkoxysilanes, fluoro functional alkoxysilanes, vinyl functional alkoxysilanes, or methacrylate functional alkoxysilanes; and (ii) adding a sulfidosilane, a mercapto functional alkoxysilane, a phosphonated silane, or mixtures thereof, to the restoration fluid to improve the corrosion resistance of the aluminum, as it comes into contact with corrosive agents at elevated temperatures.

9 Claims, No Drawings

PHOSPHONATE AND SULFIDO SILANE ANTI-CORROSION ADDITIVE FOR ELECTRICAL CABLE RESTORATION FLUID

CROSS REFERENCE TO RELATED APPLICATIONS

This application is a U.S. national stage filing under 35 U.S.C. §371 of PCT Application No. PCT/US2005/020267 filed on Jun. 7, 2005, currently pending, which claims the benefit of U.S. Provisional Patent Application No. 60/578,185 filed Jun. 9, 2004 under 35 U.S.C. 119 (e). PCT Application No. PCT/US2005/020267 and U.S. Provisional Patent Application No. 60/578,185 are hereby incorporated by reference.

DESCRIPTION

The present invention relates to an improved method of restoring polyolefin insulated stranded conductor distribution cable which has significant deterioration in its performance due to electrical and/or water treeing of its insulation.

A major problem associated with buried electrical distribution cable is its tendency over time to fail due to the progressive degradation of its insulation. The degradation of polymeric insulations in many cases can be correlated to the development and growth of water tree structures in the material. These water tree structures have been studied extensively. Their development is known to occur when water present inside the insulation material is exposed to an electric field. Water trees grow in size over time usually spanning on the order of years. As they grow, they reduce the overall efficacy of the insulation. Eventually, electrical stresses across the tree's branchlike structures discharge which leads to insulation failure. This failure mode is known to be a leading cause of failure in buried, aged, solid dielectric cables.

One of the most successful processes to prevent cable insulation degradation in buried electrical distribution cable involves using alkoxy functional silanes as tree retardant liquids, and providing the alkoxy functional tree retardant materials to the cable. In such process, the method of restoration is carried out by filling the voids formed by treeing degradation with a material that reacts with the water in the voids to form the tree retardant materials.

In particular, and according to the process, the cable is restored by filling the tree voids with a material that will react with the water in those voids and form a polymerized product which will keep water from penetrating into those voids. The tree retardant fluid is supplied to the interstices of the conductor cable until a sufficient portion of the fluid is absorbed by the polyolefin insulation of the distribution cable to effectively act as an anti-treeing agent.

The tree retardant fluid will react with the water in the tree voids, and condenses to form a polysiloxane material of sufficient viscosity that it will not exude from the polyolefin material as rapidly as other materials such as acetophenone or unhydrolyzed silanes. After polymerization to a higher viscosity in the insulation material, the tree retardant becomes less mobile, and is less able to exude from the cable. This increases the durability of the treeing retardancy imparted to the cable.

The silanes comprising the tree retardant organosilicon fluid supplied to the interstices of the distribution cable are known as anti-treeing additives for polyolefin insulation. The silanes serve two purposes; (i) to act as anti-treeing additives by condensing with the water found in the micro voids of the already formed trees to form a condensed polysiloxane which retards further water entry into the tree void; and (ii) to provide an additional supply of tree retardant liquid in the conductor voids, which prevents the spread of the water along the conductor.

Specific silanes which are typically used as restoration fluids include a single silane or a mixture of silanes, among which are aromatic functional alkoxysilanes, alkylalkoxysilanes, amino functional alkoxysilanes, epoxy functional alkoxysilanes, fluoro functional alkoxysilanes, vinyl functional alkoxysilanes, and methacrylate functional alkoxysilanes.

Some examples of aromatic functional alkoxysilanes are phenylmethyldimethoxysilane, diphenyldimethoxysilane, benzylmethyldimethoxysilane, phenyltrimethoxysilane, phenyldimethylmethoxysilane, diphenylmethylmethoxysilane, phenylmethyldiethoxysilane, phenyltriethoxysilane, diphenyldiethoxysilane, methyl(β-phenethyl)dimethoxysilane, p-tolylmethyldimethoxysilane, and mixtures thereof.

Some examples of alkylalkoxysilanes are dimethyldimethoxysilane, dimethyldiethoxysilane, methyltriethoxysilane, methyltrimethoxysilane, ethyltrimethoxysilane, n-propyltrimethoxysilane, isobutyltriethoxysilane, isobutyltrimethoxysilane, n-octyltriethoxysilane, n-octyltrimethoxysilane, trimethylmethoxysilane, trimethylethoxysilane, and mixtures thereof.

Some examples of amino functional alkoxysilanes are aminoethylaminopropyltrimethoxysilane, 3-aminopropyltriethoxysilane, 3-aminopropyltrimethoxysilane, N-2-(benzylamino)-ethyl-3-aminopropyltrimethoxysilane, 4-aminobutyltriethoxysilane, and mixtures thereof.

Some examples of epoxy functional alkoxysilanes are 3-glycidoxypropyltriethoxysilane, 3-glycidoxypropyltrimethoxysilane, 3-glycidoxypropyldimethylethoxysilane, 3-glycidoxypropylmethyldiethoxysilane, and mixtures thereof.

Some examples of fluoro functional alkoxysilanes are trifluoropropylmethyldimethoxysilane, trifluoroacetoxypropyltrimethoxysilane, p-rifluoromethyltetrafluorophenyltriethoxysilane, 3,3,3-trifluoropropyltrimethoxysilane, and mixtures thereof.

Some examples of vinyl functional alkoxysilanes are vinyltriethoxysilane, vinyltrimethoxysilane, vinyltriacetoxysilane, vinylmethyldiethoxysilane, vinylmethyldimethoxysilane, vinylphenyldiethoxysilane, vinylphenylmethylmethoxysilane, hexenylmethyldimethoxysilane, and mixtures thereof.

Some examples of methacrylate functional alkoxysilanes are methacryloxymethyldimethylethoxysilane, 3-methacryloxypropyltrimethoxysilane, methacryloxymethyltriethoxysilane, methacryloxymethyltrimethoxysilane, methacryloxypropyldimethylmethoxysilane, and mixtures thereof.

While the above mentioned alkoxysilanes are generally representative of the preferred compositions, if desired, other types of alkoxysilanes can also be used, such as bis-2-(dimethoxydimethylsilyl)ethylbenzene, poly(oxyethylene) methyldimethoxysilane, 2-cyanoethyltriethoxysilane, 3-cyanopropyldimethoxysilane, n-(3-propyltrimethoxysilyl) benzylimine, and N-methyl-N-(3-propyltrimethoxysilyl) acrylamide.

Mixtures are particularly favored because of the control over the rate of increase in viscosity one can effect by carefully maintaining the correct ratio among the alkoxysilanes. Thus, the organosilicon fluid should be capable of curing in the presence of atmospheric moisture to a gel having a viscosity of at least about 100 centistokes at 25° C. within 2,000 hours of being subjected to atmospheric moisture. Accordingly, the most preferred combination of silanes should be that combination which allows the fastest absorption of the anti-treeing silanes, such that they allow for the most time effective restoration of tree aged cables, while still providing a gel which slows the exudation rate of the tree retardant from the cable insulation.

The mixture of silanes generally includes a hydrolysis condensation catalyst in order to increase the viscosity of the fluid, to provide a more effective moisture barrier within the interstices of the distribution cable should moisture penetrate the insulation. The amount of catalyst employed should allow the fluid to permeate the insulation before forming a more viscous fluid in the polyolefin insulation material that will not easily exude from the cable insulation. Formation of the more viscous fluid in the polyolefin insulation controls the rate at which the anti-treeing agent will exude from the insulation, and will effectively prolong the treated life of the insulation. Typically, the catalyst is employed in amounts between 0.05 and 5 grams per 100 grams of the fluid.

Catalysts typically used include organic metal compounds like the carboxylic acid salts of metals such as tin, manganese, iron, cobalt, nickel, and lead, or organometallic compounds of titanium or zirconium. Specific catalyst types include alkyl titanates, acyl titanates, and the corresponding zirconates. Some preferred compounds include tetraisopropyltitanate, tetrabutyltitanate, dibutyltindiacetate, dibutyltindilaurate, dibutyltindioctoate, stannous octoate, dimethyltinneodeconoate, di-N-octyltin-S,S-isooctylmercaptoacetate, dibutyltin-S,S-dimethylmercaptoacetate, or diethyltin-S,S-dibutylmercaptoacetate.

The insulation material of cables which are restored generally comprise polyolefins including solid polymers of olefins, particularly alpha-olefins, which comprise from about two to six carbon atoms. Some examples include crosslinkable and noncrosslinkable polyethylene, polypropylene, polybutene, polyisobutylene, and poly-(4-methyl pentene). Copolymers of ethylene and other compounds interpolymerizable with ethylene such as butene-1, pentene-1, propylene, and styrene, are also common. Suitable examples of olefin-vinyl copolymers include ethylene-vinyl acetate, ethylene-vinyl propionate, ethylene-vinyl isobutyrate, ethylene-vinyl alcohol, ethylene-methyl acrylate, ethylene-ethyl acrylate, and ethylene-ethyl methacrylate. Specific examples of olefin-allyl copolymers include ethylene-allyl benzene, ethylene-allyl ether, and ethyleneacrolein.

Anti-treeing fluids are supplied to the interstices of the distribution cable in several ways. A vacuum can be applied to one end of the cable, and the fluid drawn through the cable from a reservoir of the fluid. Alternately, a reservoir of the fluid can be pressurized, forcing the fluid through the cable. Some common additional steps that can occur are the inclusion of a preliminary step of introducing a desiccant gas such as nitrogen or a desiccant fluid such as isopropanol through the cable in order to purge the cable of water moisture.

While the above process has many advantages and is generally being used in the field, it has certain disadvantages. Under certain cable conditions, like high cable temperatures, the restoration fluid can boil at the liquid to solid surface interface. Some alkoxysilanes, such as trimethylmethoxysilane, have low boiling points, which may allow the restoration fluid to boil at normal operating temperatures of the cable. This boiling action can disrupt and wear away the protective aluminum oxide layer on the aluminum strands in the cable. After this oxide layer is disrupted, corrosion agents can react with the aluminum to produce other corrosion products. The boiling action will continue to wash away the corrosion products leading to continued corrosion of the aluminum. This corrosion may at times lead to cable failure.

According to this invention, however, it was unexpectedly discovered that the addition of sulfidosilanes, mercapto functional alkoxysilanes, phosphonated silanes, or mixtures thereof, reduces corrosion in the presence of a corrosion agent, even while the liquid is boiling. Analytical techniques have shown that silanes containing phosphorous and sulfur are bonded directly to the aluminum. Reference may be had to Table 3 in the Examples section below. The film that is formed is believed to be stronger, and is capable of withstanding boiling of the fluid in contact with the aluminum. Thus, little to no corrosion has been observed.

Thus, the invention herein relates to a method of restoring electrical distribution cables that have lowered performance due to treeing by (i) supplying the interstices of stranded aluminum conductor portions of such cables with a restoration fluid comprising an alkoxysilane or mixture of alkoxysilanes selected from aromatic functional alkoxysilanes, alkylalkoxysilanes, amino functional alkoxysilanes, epoxy functional alkoxysilanes, fluoro functional alkoxysilanes, vinyl functional alkoxysilanes, and methacrylate functional alkoxysilanes; and (ii) adding a sulfidosilane, a mercapto functional alkoxysilane, a phosphonated silane, or mixtures thereof, to the restoration fluid to improve the corrosion resistance of the aluminum, as it comes into contact with corrosive agents at elevated temperatures.

It also relates to a composition for improving the corrosion resistance of electrical distribution cables which is a combination of (i) an alkoxysilane or mixture of alkoxysilanes selected from aromatic functional alkoxysilanes, alkylalkoxysilanes, amino functional alkoxysilanes, epoxy functional alkoxysilanes, fluoro functional alkoxysilanes, vinyl functional alkoxysilanes, or methacrylate functional alkoxysilanes; and (ii) a sulfidosilane, a mercapto functional alkoxysilane, a phosphonated silane, or mixtures thereof.

While the composition can contain varying amounts of the restoration fluid, and varying amounts of the sulfidosilane, mercapto functional alkoxysilane, phosphonated silane, or their mixture, it is preferred that the composition contain 50-99 percent by weight of the restoration fluid, and 1-50 percent by weight of the sulfidosilane, mercapto functional alkoxysilane, phosphonated silane, or their mixture, alternatively 65-95 percent by weight of the restoration fluid, and 5-35 percent by weight of the sulfidosilane, mercapto functional alkoxysilane, phosphonated silane, or their mixture.

The sulfur containing organosilicon compounds, i.e., sulfidosilanes, are known in the art, and are described in U.S. Pat. No. 6,384,255 (May 7, 2002); U.S. Pat. No. 6,384,256 (May 7, 2002); U.S. Pat. No. 6,448,426 (Sep. 10, 2002); and U.S. Pat. No. 6,534,668 (Mar. 18, 2003), which are incorporated herein by reference. As used herein, the term sulfidosilane is used in the sense of describing compositions having bis-type molecular constructions.

Such sulfur containing organosilicon compounds have the formula:

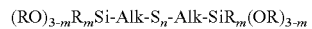

$(RO)_{3-m}R_m Si\text{-}Alk\text{-}S_n\text{-}Alk\text{-}SiR_m(OR)_{3-m}$ wherein R is independently a monovalent hydrocarbon of 1-12 carbon atoms; Alk is a divalent hydrocarbon of 1-18 carbon atoms; m is an integer of 0 to 2, and n is a number from 1-8. Some examples of sulfur containing organosilicon compounds which may be used in accordance with the present invention are described in U.S. Pat. No. 5,405,985 (Apr. 11, 1995); U.S. Pat. No. 5,468,893 (Nov. 21, 1995); U.S. Pat. No. 5,583,245 (Dec. 10, 1996); and U.S. Pat. No. 5,663,396 (Sep.

2, 1997); which are hereby incorporated by reference. The preferred sulfur containing organosilicon compounds in accordance with the present invention are the 3,3'-bis(trialkoxysilylpropyl)polysulfides. The most preferred compounds are 3,3'-bis(triethoxysilylpropyl)disulfide (referred to as TPD) and 3,3'-bis(triethoxysilylpropyl)tetrasulfide (referred to as TPT).

Some other examples of sulfur containing organosilicon compounds which may be used in accordance with the present invention include:
3,3'-bis(trimethoxysilylpropyl)disulfide,
3,3'-bis(triethoxysilylpropyl)octasulfide,
3,3'-bis(trimethoxysilylpropyl)tetrasulfide,
2,2'-bis(triethoxysilylethyl)tetrasulfide,
3,3'-bis(trimethoxysilylpropyl)trisulfide,
3,3'-bis(triethoxysilylpropyl)trisulfide,
3,3'-bis(tributoxysilylpropyl)disulfide,
3,3'-bis(trimethoxysilylpropyl)hexasulfide,
3,3'-bis(trimethoxysilylpropyl)octasulfide,
3,3'-bis(trioctoxysilylpropyl)tetrasulfide,
3,3'-bis(trihexoxysilylpropyl)disulfide,
3,3'-bis(tri-2"-ethylhexoxysilylpropyl)trisulfide,
3,3'-bis(triisooctoxysilylpropyl)tetrasulfide,
3,3'-bis(tri-t-butoxysilylpropyl)disulfide,
2,2'-bis(methoxydiethoxysilylethyl)tetrasulfide,
2,2'-bis(tripropoxysilylethyl)pentasulfide,
3,3'-bis(tricyclohexoxysilylpropyl)tetrasulfide,
3,3'-bis(tricyclopentoxysilylpropyl)trisulfide,
2,2'-bis(tri-2"-methylcyclohexoxysilylethyl)tetrasulfide,
bis(trimethoxysilylmethyl)tetrasulfide,
3-methoxyethoxypropoxysilyl-3'-diethoxybutoxysilylpropyltetrasulfide,
2,2'-bis(dimethylmethoxysilylethyl)disulfide,
2,2'-bis(dimethylsec-butoxysilylethyl)trisulfide,
3,3'-bis(methylbutylethoxysilylpropyl)tetrasulfide,
3,3'-bis(di-t-butylmethoxysilylpropyl)tetrasulfide,
2,2'-bis(phenylmethylmethoxysilylethyl)trisulfide,
3,3'-bis(diphenylisopropoxysilylpropyl)tetrasulfide,
3,3'-bis(diphenylcyclohexoxysilylpropyl)disulfide,
3,3'-bis(dimethylethylmercaptosilylpropyl)tetrasulfide,
2,2'-bis(methyldimethoxysilylethyl)trisulfide,
2,2'-bis(methylethoxypropoxysilylethyl)tetrasulfide,
3,3'-bis(diethylmethoxysilylpropyl)tetrasulfide,
3,3'-bis(ethyl-di-sec-butoxysilylpropyl)disulfide,
3,3'-bis(propyldiethoxysilylpropyl)disulfide,
3,3'-bis(butyldimethoxysilylpropyl)trisulfide,
3,3'-bis(phenyldimethoxysilylpropyl)tetrasulfide,
3-phenylethoxybutoxysilyl-3'-trimethoxysilylpropyl tetrasulfide,
4,4'-bis(trimethoxysilylbutyl)tetrasulfide,
6,6'-bis(triethoxysilylhexyl)tetrasulfide,
12,12'-bis(triisopropoxysilyldodecyl)disulfide,
18,18'-bis(trimethoxysilyloctadecyl)tetrasulfide,
18,18'-bis(tripropoxysilyloctadecenyl)tetrasulfide,
4,4'-bis(trimethoxysilyl-buten-2-yl)tetrasulfide,
4,4'-bis(trimethoxysilylcyclohexylene)tetrasulfide,
5,5'-bis(dimethoxymethylsilylpentyl)trisulfide,
3,3'-bis(trimethoxysilyl-2-methylpropyl)tetrasulfide,
3,3'-bis(dimethoxyphenylsilyl-2-methylpropyl)disulfide,
and mixtures thereof.

The disulfidosilane TPD has a composition generally corresponding to the formula $(C_2H_5O)_3Si(CH_2)_3-S_x-(CH_2)_3Si(OC_2H_5)_3$. In the formula, x indicates an average sulfur chain length of about 2.2. The tetrasulfidosilane TPT has a composition that also generally corresponds to the formula $(C_2H_5O)_3Si(CH_2)_3-S_x-(CH_2)_3Si(OC_2H_5)_3$. In the formula, x indicates an average sulfur chain length of about 3.75.

Some examples of additional sulfur containing organosilicon compounds which may be used in accordance with the present invention include mercapto functional alkoxysilanes such as mercaptomethylmethyldiethoxysilane, 3-mercaptopropylmethyldimethoxysilane, 3-mercaptopropyltrimethoxysilane, 3-mercaptopropyltriethoxysilane, mercaptotrimethoxysilane, and mixtures thereof.

The silylalkyl esters of phosphorous, i.e., phosphonated silanes, are also know in the art, and are described in U.S. Pat. No. 4,093,641(Jun. 6, 1978), which is incorporated herein by reference. A preferred monomeric silylalkyl phosphonate is (trimethoxysilylpropyl)methylmethylphosphonate (referred to as TMP), and a method for its preparation is set forth in Example 2 of the '641 patent.

The phosphonated silane TMP has a composition generally corresponding to the formula:

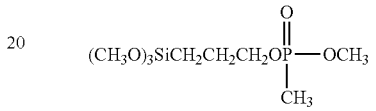

The following examples are set forth in order to illustrate the invention in more detail. In the examples, a mixture of silanes was used as the restoration fluid (RF). This restoration fluid comprises a mixture consisting of about 70 percent by weight of phenylmethyldimethoxysilane, i.e., $C_6H_5CH_3Si(OCH_3)_2$, about 30 percent by weight of trimethylmethoxysilane, i.e., $(CH_3)_3Si(OCH_3)$, and minor amounts of tetraisopropyltitanate which functions as a hydrolysis and condensation catalyst, and a blue dye. It is shown in Table 1 as RF.

The treatment fluid used in the examples was one of (i) bis(triethoxysilylpropyl)disulfide shown in Table 1 as TPD, (ii) bis(triethoxysilylpropyl)tetrasulfide shown in Table 1 as TPT, and (iii) (trimethoxysilylpropyl)methylmethylphosphonate shown in Table 1 as TMP.

The mixtures of the restoration fluid and the treatment fluid are shown in Table 1 in weight percent of each component. In addition, but not shown, is methanol which was added to the mixtures as shown in the Example.

EXAMPLES

Benz ovens were used to heat the silane mixtures and to expose the silanes and corrosion agent to aluminum. A corrosion agent was added to cause corrosion of the aluminum. The Benz oven used included 275 milliliter test tubes that fit into slots in the oven. Water-cooled condensers were placed on top of the tubes to limit the evaporation of the fluids. 150 milliliter of the silane mixture and 10 milliliter of a corrosion agent were added to the tube. 30 strands of aluminum that were about 2 inches long that had been removed from an aged electrical cable, were weighed on an analytical balance, and placed in the tube. The tube was placed in the oven and heated to 70° C. for 10 days. The testing was performed in triplicate. After the 10 days, the tubes were removed. The aluminum strands were separated from the fluid and any corrosion products.

In the first Comparative Example, the aluminum strands were cleaned with nitric acid after rinsing the strands with water. The procedure in ASTM G1 for removing corrosion from aluminum was used throughout the procedure. Before weighing, the strands were rinsed with acetone and allowed to dry. The weight after the test was compared to the weight before the test, to arrive at the milligrams of corrosion/day. In the second Comparative Example, the aluminum strands were rinsed with isopropanol and then acetone, and then weighed and not cleaned with nitric acid.

TABLE 1

Formulation of Restoration Fluid/Treatment Fluid Mixtures

| Example | Weight % RF | Weight % TPD | Weight % TPT | Weight % TMP |
|---|---|---|---|---|
| 1- Comparative | 100 | | | |
| 1-1 | 95 | 5 | | |
| 1-2 | 95 | | 5 | |
| 1-3 | 95 | | | 5 |
| 2- Comparative | 100 | | | |
| 2-1 | 70 | 30 | | |
| 2-2 | 70 | | 30 | |
| 2-3 | 70 | | | 30 |
| 2-4 | 85 | 15 | | |

TABLE 2

Aluminum Corrosion Results

| Example | Average mg of corrosion/day |
|---|---|
| 1- Comparative | 153 |
| 1-1 | 107 |
| 1-2 | 131 |
| 1-3 | 112 |
| 2- Comparative | 132 |
| 2-1 | 3 |
| 2-2 | 22 |
| 2-3 | 4 |
| 2-4 | 53 |

Table 2 shows that the addition of the sulfidosilane and the phosphonated silane reduces corrosion from levels of 153 milligram per day and 132 milligram per day, to respective levels much less than the Comparative Examples, depending on the amount of the silanes that is added.

The results of X-ray Photoelectron Spectroscopy (XPS) or Electron Spectroscopy for Chemical Analysis (ESCA) are shown in Table 3. The values shown in Table 3 are the average of four values collected at four locations along the aluminum strand.

TABLE 3

Surface Composition of Wire Strands in Atomic Percent (Average of 4 Positions)

| Example | Na | F | O | Ti | N | Ca | C | Cl | S | Si | Al | P | sum |
|---|---|---|---|---|---|---|---|---|---|---|---|---|---|
| 2- Comparative | <0.1 | 0.2 | 46.5 | 0.8 | 0.4 | 0 | 29.7 | 0.13 | 0 | 2.85 | 19.4 | 0 | 100 |
| 2-1 | 0.15 | 0.2 | 50.3 | 0.3 | 0.9 | 0.1 | 23.1 | 0.1 | 1.83 | 1.15 | 22.1 | 0 | 100 |
| 2-3 | 0.1 | 0.3 | 50.4 | 0 | 0.1 | 0 | 12.9 | 0 | 0 | 1.9 | 31.1 | 2.7 | 99.67 |

A silane layer on the aluminum in the Comparative Example that was exposed to the RF fluid was apparently relatively weak, as the corrosion was extremely high. The sulfidosilane and the phosphonated silane also formed a layer on the aluminum surface (2-1,2-3), as sulfur and phosphorous were present on the surface of the aluminum, but were not present in the Comparative Example. Table 3 verifies that the sulfidosilane and the phosphonated silane actually deposited sulfur and phosphorous respectively on the aluminum strand. In Examples 2-1 and 2-3, the silane films were not disrupted with the boiling action of the fluids, since the sulfur and phosphorus were present on the aluminum surface, and the corrosion of the aluminum was less than the RF fluid. Therefore, these films provided better protection of the aluminum from further corrosion than the RF fluid.

Other variations may be made in compounds, compositions, and methods described herein without departing from the essential features of the invention. The embodiments of the invention specifically illustrated herein are exemplary only and not intended as limitations on their scope except as defined in the appended claims.

The invention claimed is:

1. A method of restoring electrical distribution cables that have lowered performance due to treeing comprising (i) supplying the interstices of stranded aluminum conductor portions of such cables with a restoration fluid comprising an alkoxysilane or mixture of alkoxysilanes selected from aromatic functional alkoxysilanes, alkylalkoxysilanes, amino functional alkoxysilanes, epoxy functional alkoxysilanes, fluoro functional alkoxysilanes, vinyl functional alkoxysilanes, or methacrylate functional alkoxysilanes; and (ii) adding a sulfidosilane, a phosphonated silane, or mixtures thereof, to the restoration fluid to improve the corrosion resistance of the aluminum, as it comes into contact with corrosive agents at elevated temperatures.

2. A method according to claim 1 in which the aromatic functional alkoxysilane is selected from phenylmethyldimethoxysilane, diphenyldimethoxysilane, benzylmethyldimethoxysilane, phenyltrimethoxysilane, phenyldimethylmethoxysilane, diphenylmethylmethoxysilane, phenylmethyldiethoxysilane, phenyltriethoxysilane, diphenyldiethoxysilane, methyl(β-phenethyldimethoxysilane, p-tolylmethyldimethoxysilane, and mixtures thereof.

3. A method according to claim 1 in which the alkylalkoxysilane is selected from dimethyldimethoxysilane, dimethyldiethoxysilane, methyltriethoxysilane, methyltrimethoxysilane, ethyltrimethoxysilane, n-propyltrimethoxysilane, isobutyltriethoxysilane, isobutyltrimethoxysilane, n-octyltriethoxysilane, n-octyltrimethoxysilane, trimethylmethoxysilane, trimethylethoxysilane and mixtures thereof.

4. A method according to claim 1 in which the sulfidosilane is selected from
3,3'-bis(triethoxysilylpropyl)disulfide,
3,3'-bis(triethoxysilylpropyl)tetrasulfide
3,3'-bis(trimethoxysilylpropyl)disulfide,
3,3'-bis(triethoxysilylpropyl)octasulfide,
3,3'-bis(trimethoxysilylpropyl)tetrasulfide,
2,2'-bis(triethoxysilylethyl)tetrasulfide,
3,3'-bis(trimethoxysilylpropyl)trisulfide,
3,3'-bis(triethoxysilylpropyl)trisulfide,
3,3'-bis(tributoxysilylpropyl)disulfide,
3,3'-bis(trimethoxysilylpropyl)hexasulfide,
3,3'-bis(trimethoxysilylpropyl)octasulfide,
3,3'-bis(trioctoxysilylpropyl)tetrasulfide,
3,3'-bis(trihexoxysilylpropyl)disulfide,
3,3'-bis(tri-2"-ethylhexoxysilylpropyl)trisulfide, 3,3'-bis(triisooctoxysilylpropyl)tetrasulfide,
3,3'-bis(tri-t-butoxysilylpropyl)disulfide,
2,2'-bis(methoxydiethoxysilylethyl)tetrasulfide,
2,2'-bis(tripropoxysilylethyl)pentasulfide,
3,3'-bis(tricyclohexoxysilylpropyl)tetrasulfide,
3,3'-bis(tricyclopentoxysilylpropyl)trisulfide,
2,2'-bis(tri-2"-methylcyclohexoxysilylethyl)tetrasulfide,
bis(trimethoxysilylmethyl)tetrasulfide,
3-methoxyethoxypropoxysilyl-3'-diethoxybutoxysilyl-propyltetrasulfide,
2,2'-bis(dimethylmethoxysilylethyl)disulfide,
2,2'-bis(dimethylsec-butoxysilylethyl)trisulfide,
3,3'-bis(methylbutylethoxysilylpropyl)tetrasulfide,
3,3'-bis(di-t-butylmethoxysilylpropyl)tetrasulfide,
2,2'-bis(phenylmethylmethoxysilylethyl)trisulfide,
3,3'-bis(diphenyl)sopropoxysilylpropyl)tetrasulfide,
3,3'-bis(diphenylcyclohexoxysilylpropyl)disulfide,
3,3'-bis(dimethylethylmercaptosilylpropyl)tetrasulfide,
2,2'-bis(methyldimethoxysilylethyl)trisulfide,
2,2'-bis(methylethoxypropoxysilylethyl)tetrasulfide,
3,3'-bis(diethylmethoxysilylpropyl)tetrasulfide,
3,3'-bis(ethyl-di-sec-butoxysilylpropyl)disulfide,
3,3'-bis(propyldiethoxysilylpropyl)disulfide,
3,3'-bis(butyldimethoxysilylpropyl)trisulfide,
3,3'-bis(phenyldimethoxysilylpropyl)tetrasulfide,
3-phenylethoxybutoxysilyl-3'-trimethoxysilylpropyl tetrasulfide,
4,4'-bis(trimethoxysilylbutyl)tetrasulfide,
6,6'-bis(triethoxysilylhexyl)tetrasulfide,
12,12'-bis(triisopropoxysilyldodecyl)disulfide,
18,18'-bis(trimethoxysilyloctadecyl)tetrasulfide,
18,18'-bis(tripropoxysilyloctadecenyl)tetrasulfide,
4,4'-bis(trimethoxysilyl-buten-2-yl)tetrasulfide,
4,4'-bis(trimethoxysilylcyclohexylene)tetrasulfide,
5,5'-bis(dimethoxymethylsilylpentyl)trisulfide,
3,3'-bis(trimethoxysilyl-2-methylpropyl)tetrasulfide,
3,3'-bis(dimethoxyphenylsilyl-2-methylpropyl)disulfide, and mixtures thereof.

5. A method according to claim 1 in which the phosphonated silane is (trimethoxysilylpropyl)methylmethylphosphonate.

6. A method according to claim 1 in which the restoration fluid comprises 50-99 percent by weight of an alkoxysilane or mixture of alkoxysilanes selected from aromatic functional alkoxysilanes, alkylalkoxysilanes, amino functional alkoxysilanes, epoxy functional alkoxysilanes, fluoro functional alkoxysilanes, vinyl functional alkoxysilanes, or methacrylate functional alkoxysilanes and 1-50 percent by weight of the sulfidosilane, phosphonated silane, or their mixture.

7. A method according to claim 1 in which the restoration fluid is a mixture of an alkylalkoxysilane and an aromatic functional alkoxysilane.

8. A method according to claim 7 in which (ii) is a sulfidosilane.

9. A method according to claim 7 in which (ii) is a phosphonated silane.

* * * * *